Aug. 31, 1948.                A. WILLETT, JR                    2,448,480
                               BRAKE PEDAL LOCK
Filed Oct. 20, 1947                                         2 Sheets-Sheet 1
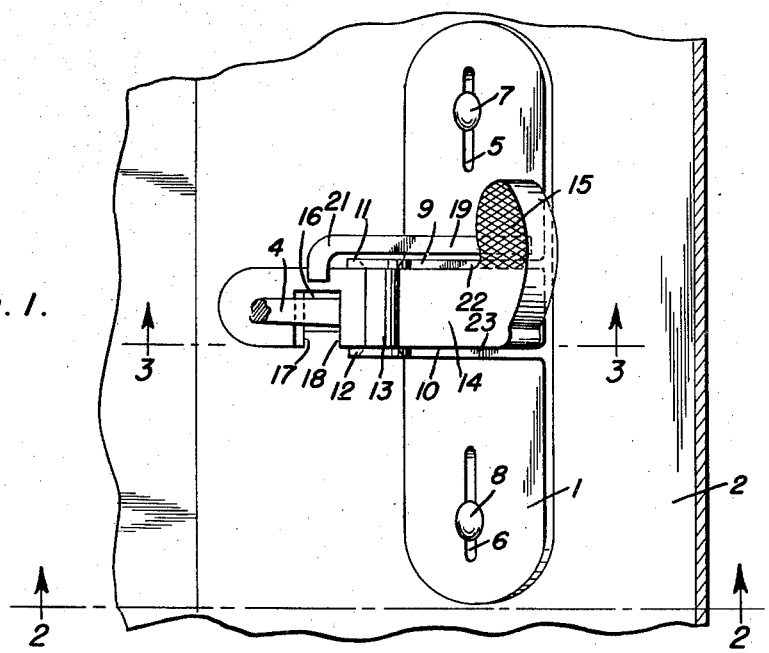
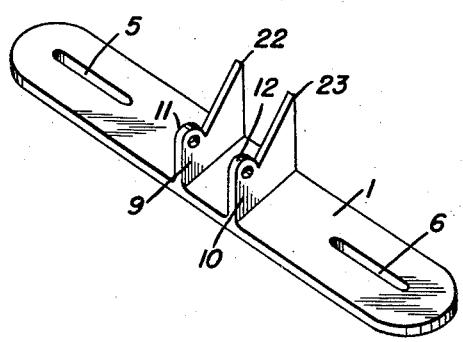
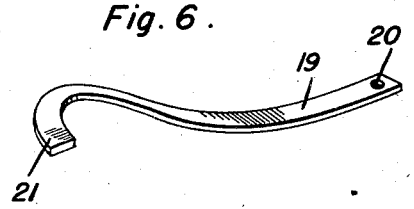
Inventor
Arthur Willett, Jr.
By *Clarence A. O'Brien and Harvey B. Jackson*
Attorneys Aug. 31, 1948.  A. WILLETT, JR  2,448,480
BRAKE PEDAL LOCK
Filed Oct. 20, 1947  2 Sheets-Sheet 2
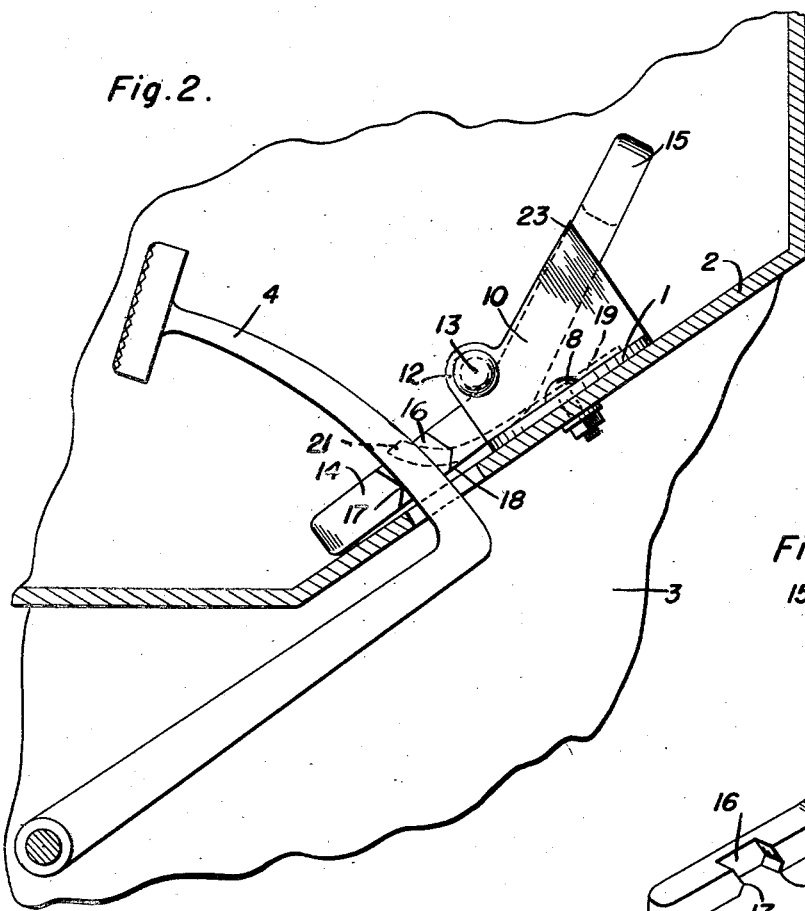
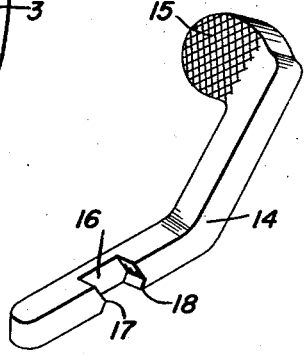
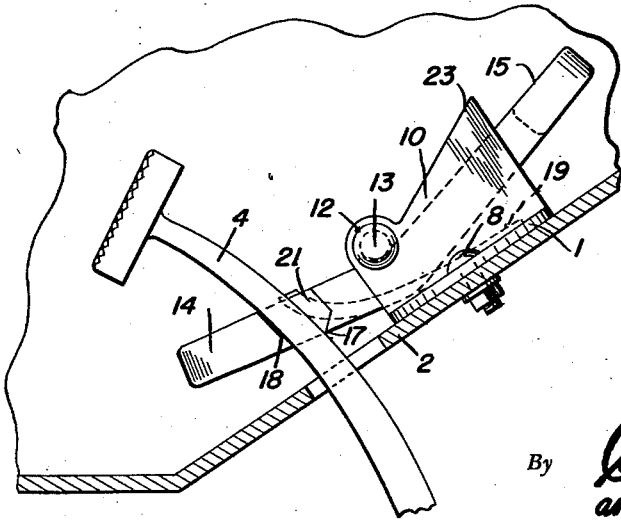
Inventor
Arthur Willett, Jr.
By
Attorneys Patented Aug. 31, 1948

2,448,480

UNITED STATES PATENT OFFICE 2,448,480

BRAKE PEDAL LOCK

Arthur Willett, Jr., Bay City, Mich.

Application October 20, 1947, Serial No. 780,935

4 Claims. (Cl. 74—542)

This invention relates to improvements in brake pedal locks.

An object of the invention is to provide an improved brake pedal lock construction.

Another object of the invention is to provide an improved locking device for locking an automobile brake pedal in depressed or applied position, and means for automatically releasing the same when the brake pedal is further depressed a slight distance.

A further object of the invention is to provide an improved rockable locking arm for locking a brake pedal when in depressed or applied position, together with a spring for cooperating therewith for positively exerting a resilient tension upon the locking lever.

A still further object of the invention is to provide an improved brake pedal lock which will be highly efficient in operation and relatively inexpensive to manufacture and produce.

Other objects will appear as the description proceeds.

In the accompanying drawings which form a part of this application,

Figure 1 is a top plan view of the improved brake pedal locking device;

Figure 2 is a sectional view taken on the line 2—2 of Figure 1;

Figure 3 is a sectional view taken on the line 3—3 of Figure 1;

Figure 4 is a perspective view of the brake pedal locking arm;

Figure 5 is a perspective view of the base plate upon which the brake pedal locking arm is rockably supported; and Figure 6 is a perspective view of the spring arm used in conjunction with the brake pedal locking arm for normally applying a resilient tension thereon.

Like characters of reference are used throughout the following specification and the accompanying drawings to designate corresponding parts.

In carrying out the invention, there is provided an elongated base plate 1 adapted to be secured to the floor board 2 of an automobile 3 directly in front of the foot brake pedal 4.

Spaced longitudinally extending slots 5 and 6 are formed through the opposite ends of the base plate 1, and are adapted to receive the headed securing bolts or fasteners 7 and 8 which extend through the floor board 2 for firmly securing said base plate 1 in operative position thereon.

A pair of spaced forwardly and upwardly extending parallel guide flanges 9 and 10 are formed integrally upon the upper surface of the base plate 1, and are formed with the oppositely disposed apertured ears 11 and 12 through which a transversely extending rivet 13 is adapted to be received.

A substantially V-shaped brake pedal locking arm 14 will be positioned between the guide flanges 9 and 10 for rockable movement. A laterally extending actuating pedal 15 is formed integrally upon the forward end of the locking arm 14 for engagement by the left foot of the driver of the automobile after the brake pedal 4 has been depressed to the applied or brake locking position.

An inwardly extending locking notch 16 is formed in the rear portion of the brake pedal locking arm 14 and is adapted to loosely extend about three sides of the foot brake pedal 4.

Oppositely disposed sharpened brake pedal clamping or locking edges or teeth 17 and 18 are formed in the front and rear edges of said notch 16 for firmly engaging the brake pedal 4 when the rear end of the locking arm 14 has been raised by pressing down upon the forward end or actuating pedal 15 of the brake pedal locking arm 14.

A hooked leaf spring 19 is apertured at 20 and is adapted to be supported at the left side of the locking arm 14 with the hooked upwardly and laterally extending rear end 21 thereof overlying the rear end of the locking arm 14 for normally holding the same in inoperative or released position.

The upwardly extending angled front portions 22 and 23 of the guide flanges 9 and 10 extend above or to a higher level than the front end of the locking arm 14 when in its highest position, thereby serving as a safety guard against accidentally locking the locking arm 14 when the foot brake pedal 4 is depressed when normally applying the brakes while driving.

In operation, the movement of the foot brake pedal while normally applying the automobile brakes will be unimpeded. When the automobile brakes are to be locked while standing upon a hill, or while changing a tire, it will be a simple matter to depress the foot brake pedal 4 until the automobile brakes are firmly set or applied, then with the other foot, the actuating pedal 15 on the locking arm 14 will be depressed, thereby causing the locking edges or teeth 17 and 18 to bite into the foot brake pedal 4 to firmly and securely lock and hold the same in brake applied position.

From the foregoing description, it will be apparent that there has been devised and provided a highly efficient form of brake pedal lock for automobiles which will be relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

1. A foot brake pedal lock including a base plate adapted to be secured forwardly of the foot brake pedal of an automobile, said plate having a pair of upwardly extending parallel guide flanges formed thereon, a V-shape brake pedal locking arm rockably supported between said guide flanges, a rivet disposed above said pedal locking arm and connected between said guide flanges, said pedal locking arm being formed with a notch in its rear end portion, and brake pedal clamping and locking teeth on the opposite edges of said notch.

2. A foot brake pedal lock including a base plate adapted to be secured forwardly of the foot brake pedal of an automobile, said plate having upwardly extending parallel guide flanges formed thereon, a V-shape brake pedal locking arm rockably supported between said guide flanges and having a laterally extending foot actuating pedal on its forward end, a rivet disposed above said pedal locking arm and connected between said guide flanges, said pedal locking arm being formed with a notch in its rear end portion, and brake clamping and locking teeth formed on the opposite edges of said notch.

3. A foot brake pedal lock including a base plate adapted to be secured forwardly of the foot brake pedal of an automobile, said plate having upwardly extending parallel guide flanges formed thereon, a V-shape brake pedal locking arm rockably supported between said guide flanges and having a laterally extending foot actuating pedal on its forward end, a rivet disposed above said pedal locking arm connected between said guide flanges, said pedal locking arm being formed with a notch in its rear end portion, brake pedal clamping and locking teeth formed on the opposite edges of said notch, and a leaf spring adapted to overlie the rear end of said brake pedal locking arm for resiliently tensioning the action of the same.

4. A foot brake pedal lock including a base plate adapted to be secured forwardly of the foot brake pedal of an automobile, said plate having upwardly extending parallel guide flanges formed thereon, a V-shape brake pedal locking arm rockably supported between said guide flanges and having a laterally extending foot actuating pedal on its forward end, a rivet disposed above said pedal locking arm connected between said guide flanges, said pedal locking arm being formed with a notch in its rear end portion, brake pedal clamping and locking teeth on the opposite edges of said notch, a leaf spring adapted to overlie the rear end of said brake pedal locking arm for resiliently tensioning the action of the same, and guard shoulders formed on the forward ends of said guide flanges for preventing the accidental actuation of said brake locking arm when said foot brake pedal is operated to apply the automobile brakes while driving.

ARTHUR WILLETT, Jr.

REFERENCES CITED

The following references are of record in the file of this patent:

UNITED STATES PATENTS

| Number | Name | Date |
| --- | --- | --- |
| 1,000,936 | Owen | Aug. 15, 1911 |
| 1,448,105 | Bell | Mar. 13, 1923 |
| 1,463,676 | Custer | July 31, 1923 |
| 1,499,948 | Sachs | July 1, 1924 |
| 1,709,254 | Former et al. | Apr. 16, 1929 |

FOREIGN PATENTS

| Number | Country | Date |
| --- | --- | --- |
| 15,504 | Great Britain | June 29, 1914 |